(12) United States Patent
Frigo et al.

(10) Patent No.: US 10,168,247 B2
(45) Date of Patent: *Jan. 1, 2019

(54) METHOD, APPARATUS AND SYSTEM FOR MINIMALLY INTRUSIVE FIBER IDENTIFICATION

(71) Applicant: AT&T Intellectual Property II, L.P., Atlanta, GA (US)

(72) Inventors: Nicholas J. Frigo, Little Silver, NJ (US); Patrick Iannone, Red Bank, NJ (US); Kenneth C. Reichmann, Hamilton, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/791,109

(22) Filed: Oct. 23, 2017

(65) Prior Publication Data

US 2018/0045605 A1   Feb. 15, 2018

Related U.S. Application Data

(60) Continuation of application No. 15/376,315, filed on Dec. 12, 2016, now Pat. No. 9,797,807, which is a
(Continued)

(51) Int. Cl.
*G02B 6/36* (2006.01)
*G01M 11/00* (2006.01)
(Continued)

(52) U.S. Cl.
CPC .......... *G01M 11/35* (2013.01); *G01M 11/088* (2013.01); *G01M 11/30* (2013.01);
(Continued)

(58) Field of Classification Search
CPC ..... G01M 11/35; G01M 11/088; G02B 6/447; H04B 10/07; G02F 1/095
See application file for complete search history.

(56) References Cited

U.S. PATENT DOCUMENTS

| 4,277,710 A | 7/1981 | Harwood et al. |
| 4,840,482 A | 6/1989 | Shigematsu et al. |

(Continued)

FOREIGN PATENT DOCUMENTS

| CA | 1093858 A | 1/1981 |
| EP | 0 390 341 A1 | 1/1990 |

(Continued)

OTHER PUBLICATIONS

U.S. Pat. No. 5,480,635, 11/2002, Russell et al. (withdrawn).
(Continued)

*Primary Examiner* — Ellen Kim

(57) ABSTRACT

A method, apparatus and system for minimally intrusive fiber identification includes imparting a time-varying modulation onto an optical signal propagating in an optical fiber and subsequently detecting the presence of the time-varying modulation in the optical signal transmitting through the fiber to identify the fiber. In a specific embodiment of the invention, a time-varying curvature is imposed on the fiber to be identified and the presence of the resultant time variation in the transmitted power of a propagating optical signal is subsequently detected for identification of the manipulated fiber.

20 Claims, 6 Drawing Sheets

Related U.S. Application Data continuation of application No. 14/984,632, filed on Dec. 30, 2015, now Pat. No. 9,534,982, which is a continuation of application No. 14/461,914, filed on Aug. 18, 2014, now Pat. No. 9,243,973, which is a continuation of application No. 13/154,245, filed on Jun. 6, 2011, now Pat. No. 8,811,780, which is a continuation of application No. 11/870,684, filed on Oct. 11, 2007, now Pat. No. 8,023,774, which is a continuation of application No. 11/323,132, filed on Dec. 30, 2005, now Pat. No. 7,283,688, which is a division of application No. 10/750,448, filed on Dec. 31, 2003, now abandoned.

(60) Provisional application No. 60/496,448, filed on Aug. 20, 2003.

(51) Int. Cl.

| | | |
|---|---|---|
| *G01M 11/08* | (2006.01) | |
| *G02B 6/44* | (2006.01) | |
| *H04B 10/07* | (2013.01) | |
| *G02F 1/095* | (2006.01) | |
| *G02B 6/28* | (2006.01) | |

(52) U.S. Cl.
CPC ............. *G02B 6/447* (2013.01); *G02F 1/095* (2013.01); *H04B 10/07* (2013.01); *G02B 6/2852* (2013.01)

(56) References Cited

U.S. PATENT DOCUMENTS

| | | | |
|---|---|---|---|
| 4,940,891 A | 7/1990 | Rast | |
| 5,040,866 A | 8/1991 | Engel | |
| 5,078,489 A | 1/1992 | Lieber | |
| 5,127,724 A | 7/1992 | James et al. | |
| 5,138,690 A | 8/1992 | Cox | |
| 5,202,746 A | 4/1993 | Sentsui et al. | |
| 5,311,614 A | 5/1994 | Caron et al. | |
| 5,315,365 A | 5/1994 | Hakimi et al. | |
| 5,315,675 A * | 5/1994 | Dennis .................. | G02B 6/4201 385/32 |
| 5,357,362 A | 10/1994 | Azuma et al. | |
| 5,591,964 A | 1/1997 | Poole | |
| 5,781,285 A | 7/1998 | Mampaey et al. | |
| 6,151,427 A | 11/2000 | Satorius | |
| 6,256,588 B1 | 7/2001 | Maida et al. | |
| 6,480,635 B1 | 11/2002 | Russell et al. | |
| 6,876,803 B2 | 4/2005 | Aikawa et al. | |
| 7,283,688 B2 | 10/2007 | Frigo et al. | |
| 8,023,774 B2 | 9/2011 | Frigo et al. | |
| 9,243,973 B2 | 1/2016 | Frigo et al. | |
| 9,534,982 B2 | 1/2017 | Frigo et al. | |
| 2002/0060620 A1 | 5/2002 | Bircann et al. | |
| 2002/0089723 A1 | 7/2002 | Patel et al. | |
| 2002/0153917 A1 | 10/2002 | Tanaka et al. | |
| 2003/0052258 A1 | 3/2003 | Dakin et al. | |
| 2005/0041902 A1 | 2/2005 | Frigo et al. | |
| 2005/0162867 A1 | 7/2005 | Sinofsky | |
| 2008/0192241 A1 | 8/2008 | He | |

FOREIGN PATENT DOCUMENTS

| | | |
|---|---|---|
| EP | 0 536 002 A2 | 5/1992 |
| JP | 02-230106 | 9/1990 |
| JP | 03-157605 | 7/1991 |
| JP | 04-204805 | 7/1992 |
| JP | 05-209810 | 8/1993 |
| JP | H 1078535 A | 3/1998 |
| JP | 63212907 | 9/1998 |
| JP | 63250604 | 10/1998 |
| JP | 63261203 | 10/1998 |
| JP | 2002525611 | 8/2002 |
| WO | WO-00/17692 | 3/2000 |

OTHER PUBLICATIONS

European Examination Application No. 04 756 078.4-2415, Aug. 13, 2010, consists of 7 unnumbered pages.
Examiner Office Letter for JP 2006-523635, dated Sep. 15, 2009, consists of 5 pages.
Office Action for CA 2,536,236, dated Nov. 12, 2008, pp. 1-3.
Written Opinion for Singaporean Application No. 200601076-3, dated May 30, 2008, consists of 4 unnumbered pages.
International Search Report from PCT/US2004/020381, dated Oct. 20, 2004.
Office Letter for JP 2006-523835, dated Sep. 11, 2012, pp. 1-6.
Examiner's Office Letter for JP 2010-074872, dated Apr. 4, 2012, 00 1-2.
Appeal Examiner's Office Letter for JP 2006-523835, dated Nov. 30, 2011, pp. 1-3.
Examination Report Application No. 04 756 078.4-1860, dated Jun. 26, 2013, consists of 6 unnumbered pages.
English translation of Examiner's Office Letter for Japanese Patent Application 2013-050436, dated Jan. 23, 2014, consists of 2 unnumbered pages.
Office Action received in corresponding Japanese Application No. 2013-050436, dated Jan. 6, 2015, pp. 1-8.
U.S. Appl. No. 15/376,315, filed Dec. 12, 2016 (now U.S. Pat. No. 9,797,807).
U.S. Appl. No. 14/984,632, filed Dec. 30, 2015 (now U.S. Pat. No. 9,534,982).
U.S. Appl. No. 14/461,914, filed Aug. 18, 2014 (now U.S. Pat. No. 9,243,973).
U.S. Appl. No. 13/154,245, filed Jun. 6, 2011 (now U.S. Pat. No. 8,811,780).
U.S. Appl. No. 11/870,684, filed Oct. 11, 2007 (now U.S. Pat. No. 8,023,774).
U.S. Appl. No. 11/323,132, filed Dec. 30, 2005 (now U.S. Pat. No. 7,283,688).
U.S. Appl. No. 10/750,448, filed Dec. 31, 2003 (Abandoned).
U.S. Appl. No. 60/496,448, filed Aug. 20, 2003 (Expired).
Office Action received in corresponding Japanese Application No. 2017-107276, dated Apr. 19, 2018, pp. 1-3.

* cited by examiner

METHOD, APPARATUS AND SYSTEM FOR MINIMALLY INTRUSIVE FIBER IDENTIFICATION

CROSS-REFERENCES TO RELATED APPLICATIONS

This application is a continuation of U.S. patent application Ser. No. 15/376,315, filed Dec. 12, 2016, now U.S. Pat. No. 9,797,807, which is a continuation of U.S. patent application Ser. No. 14/984,632, filed Dec. 30, 2015, now U.S. Pat. No. 9,534,982, which is a continuation U.S. patent application Ser. No. 14/461,914, filed Aug. 18, 2014, now U.S. Pat. No. 9,243,973, which is a continuation of U.S. patent application Ser. No. 13/154,245, filed Jun. 6, 2011, now U.S. Pat. No. 8,811,780, which is a continuation of U.S. patent application Ser. No. 11/870,684, filed Oct. 11, 2007, now U.S. Pat. No. 8,023,774, which is a continuation of U.S. patent application Ser. No. 11/323,132, filed Dec. 30, 2005, now U.S. Pat. No. 7,283,688, which is a division of U.S. patent application Ser. No. 10/750,448, filed Dec. 31, 2003 and claims the benefit of U.S. Provisional Application No. 60/496,448, filed Aug. 20, 2003, where the above identified applications are all herein incorporated by reference in their entirety.

FIELD OF THE INVENTION

The present invention relates generally to fiber identification and, more particularly, to a method, apparatus and system for identifying fibers that minimally intrudes with optical signals propagating therein.

BACKGROUND OF THE INVENTION

Modern telecommunications offices have evolved in recent years to accommodate greater volumes of traffic, thus placing larger and larger amounts of equipment (usually connected by optical fibers) in areas of limited space. In addition to the increasing numbers of optical fibers, traffic carried by each of the optical fibers is also ever-increasing. As capacity increases, problems arise in the management of the optical fibers of a telecommunication office. Specifically, because optical fibers transport large amounts of high bit-rate traffic, the disruption of such traffic leads to the disruption of service to many circuits and, as such, to many customers simultaneously.

For example, a typical telecommunications office includes a plurality of racks of transmission equipment, each having multiple fiber connections to transmitters and receivers in the line cards supported in the racks. The fibers are ultimately destined for terminals either in that specific office, at customer locations, or in other offices. These office fibers are typically bundled and laid in fiber trays that provide paths or conduits to junction points such as patch panels (e.g., lightguide cross connects) which connect the office fibers (sometimes called "jumpers") to the outside plant (OSP) fibers which carry traffic from this office to other destinations. Over time, the exact connection paths (i.e., the connection paths between ports on a lightguide cross connect to corresponding ports on the line cards in the racks) may become unknown due to, for example, labels used to identify fibers falling off), fibers being initially labeled incorrectly, or emergency maintenance action requiring a fast response not being properly documented. The unidentified or mis-identified fiber connections can ultimately lead to disastrous Quality of Service conditions. For example, assume that a technician, in the course of responding to a (loss of light) alarm, disconnects a fiber labeled as being connected to a port identified as the source of the alarm. If the fiber connection is mislabeled or unknown, the technician may in fact be disrupting a properly functioning circuit, thus creating a new error and disruption of service and delaying the repair of the original faulted circuit. As such, several means have been proposed for identifying a fiber without interrupting traffic on the fiber connection.

Such proposed means for the identification of optical communication circuits include Local Injection (LI) and Local Detection (LD) methods that have been used in practice for fusion splicing. These techniques involve bending a bundle of optical fibers in a cable at two distant locations and injecting light into the fiber at one bent portion while detecting the injected light that leaks from the fiber at the other bent portion. This method however, has several disadvantages. For example, in order to inject an adequate amount (i.e., power) of light into the coated fiber to be later detected, the fiber must be bent with a curvature large enough (i.e., radius of curvature small enough) to inject light thus causing radiated light of a large power to leak from the bent portion of the fiber to which the LI method is to be applied. This causes deterioration of a signal that is to be transmitted by the bent fiber. Therefore, if the LI method is applied during transmission of an optical signal, troubles such as channel interruption will occur in optical signal communication, and in an extreme case, cracking might occur in the coated fiber. In addition, if light having a power greater than a threshold level is injected into a fiber by the LI method, the injected light may be transmitted to an office or to subscribers resulting in the addition of a noise component that may deteriorate an optical signal being transmitted.

Therefore, a need exists for a method and apparatus for the identification of optical fibers that minimally intrudes with optical signals propagating therein.

SUMMARY OF THE INVENTION

The present invention provides methods and apparatuses for fiber identification that minimally intrudes with a propagating optical signal therein.

In one embodiment of the present invention, a method includes varying a property of an optical fiber as a function of time such that a time-varying modulation is imparted on an optical signal propagating therein, and subsequently detecting the time-varying modulation to identify the optical fiber. More specifically, in one embodiment of the present invention, a curvature of at least a portion of an optical fiber is varied as a function of time such that a small time-varying loss of power is generated in the propagating optical signal. The time-varying loss of power is subsequently detected downstream to unambiguously identify the optical fiber.

In an alternate embodiment of the present invention, birefringence of an optical fiber is varied as a function of time such that the polarization of an optical signal propagating therein is varied as a function of time. A detector adapted for the detection of the time-varied polarization (i.e., a detector including a polarizer) subsequently detects the time-varying polarization to identify the optical fiber.

In yet another embodiment of the present invention, a property, such as the frequency, of an optical signal propagating in an optical fiber is varied as a function of time. The time-varying altered property (e.g., the frequency of the optical signal) is subsequently detected for identification of an optical fiber transmitting the optical signal.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Although various embodiments of the present invention herein are being described with respect to optical fibers within a telecommunications office, it should be noted that the optical fibers and the telecommunications office presented herein are simply provided as exemplary working environments wherein various embodiments of the present invention may be applied and should not be treated as limiting the scope of the invention. It will be appreciated by those skilled in the art informed by the teachings of the present invention that the concepts of the present invention may be applied to a single or multiply-interconnected optical fibers (or waveguides) in substantially any working environment (local or remote) for the identification of the transmission medium.

Figure 1:
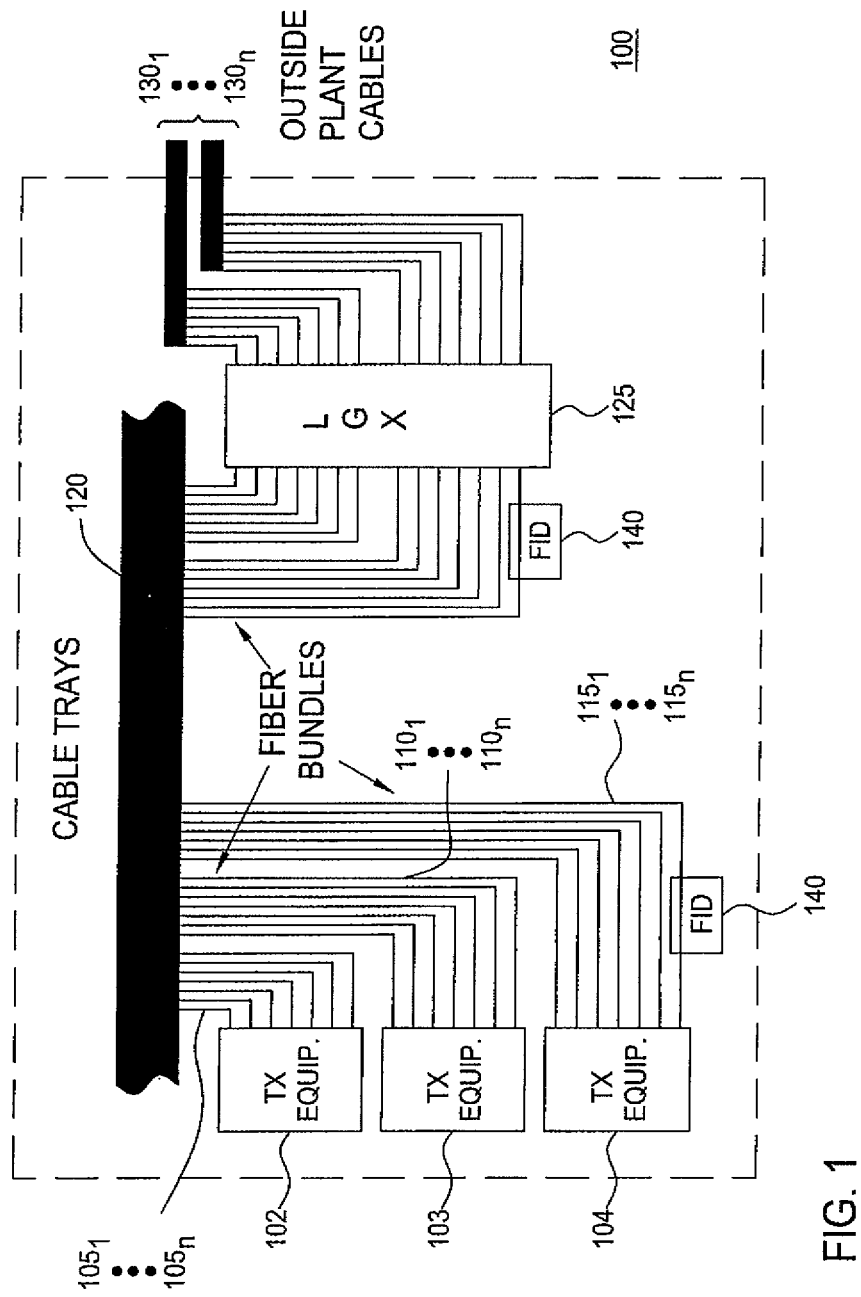
FIG. 1 depicts a high level block diagram of a telecommunications office wherein an embodiment of the present invention may be applied.

FIG. 1 depicts a high level block diagram of a telecommunications office wherein an embodiment of the present invention may be applied. The telecommunications office 100 of FIG. 1 illustratively comprises three racks of transmission equipment 102, 103, and 104, each rack having, connected to line cards therein (not shown), the first end of a plurality of transmission fibers $105_1$-$105_n$, $110_1$-$110_n$, and $115_1$-$115_n$, respectively. The telecommunications office 100 further comprises a plurality of cable trays 120, and a patch panel (illustratively a lightguide cross connect (LGX)) 125. Second ends of the plurality of transmission fibers 105, 110 and 115 are connected to ports on a first side of the LGX 125. A plurality of outside plant cables 130_1-130_m is connected to ports on a second side of the LGX 125. The telecommunications office 100 further comprises an embodiment of a fiber identification device 140 in accordance with the present invention. In FIG. 1, a first portion of the fiber identification device 140 of the present invention is illustratively located on a bottom fiber of the transmission rack 104 and a second portion of the fiber identification device 140 is located on a bottom fiber of the first side of the LGX 125.

In the telecommunications office 100, at least some of the plurality of fibers 105 may interconnect the various ports of the line cards (not shown) of the transmission rack 102 to ports on the first side of the LGX 125 (for traffic that is ultimately destined to go outside the office, for example on an outside plant fiber (OSP)). Similarly, at least some of the plurality of fibers 110 and 115 may interconnect the various ports of the line cards (not shown) of the transmission equipment racks 103 and 104, respectively, to ports on the first side of the LGX 125. In operation, communication between the transmission racks 102, 103 and 104 and the LGX 125 is accomplished over the transmission fibers 105, 110 and 115, respectively. An application of the fiber identification device 140 of the present invention is used to identify to which port of the LGX 125 a particular fiber from one of the transmission racks 102, 103 and 104 is connected or vice-versa. For example, in FIG. 1 the fiber identification device 140 of the present invention is connected to a bottom fiber of the transmission rack 104 and to a bottom fiber of the first side of the LGX 125 to determine if the fiber connected to a bottom port of the transmission rack 104 is the same fiber as the fiber connected to a bottom port of the first side of the LGX 125.

In accordance with the aspects of the present invention, an optical fiber is identified by imparting a time-varying modulation on an optical signal propagating in the optical fiber and subsequently detecting the presence of the imparted time-varying modulation to identify the optical fiber. In the present invention, the imparted time-varying modulation and the subsequent detection are performed such that the propagation of the optical signal in the optical fiber is not interrupted (described in greater detail below). For example, in various embodiments of the present invention an optical fiber is identified by varying a property of the optical fiber as a function of time, and then detecting the presence of the imparted variation in an optical signal propagating through that fiber that is correlated to the variation of the optical fiber property. For example, the curvature of an optical fiber may be varied as a function of time to impart a time-varying loss of power in an optical signal propagating therein. The presence of the imparted time-varying loss of power is then subsequently detected to identify the subject fiber.

In alternate embodiments of the present invention, an optical signal is identified by imparting a time-varying modulation on an optical signal outside of the fiber in which it is being transmitted. For example, a time-varying modulation may be imparted on an optical signal at an intermediate point between two sections of fiber (i.e., at the location of a free space beam expander), and the presence of the modulation subsequently identified in the transmission fiber to identify the fiber path. In addition, a time-varying modulation may be imparted on one or a plurality of optical signals outside of a fiber or fiber path in which the optical signals are to be transmitted. For example, a transmitter or transmitters may be controlled to apply a distinctive additional signal or over-modulation (i.e., time-varying modulation) of an optical signal to be transmitted in an optical fiber or fibers to be identified.

Finally, it should be noted that in the description of the various embodiments herein, the use of the term "fiber" may be used to identify a single fiber for transmitting an optical signal, or a fiber path comprising a plurality of interconnected fibers for transmitting an optical signal across a network. That is, the aspects of the present invention may be implemented to identify a single fiber transmitting an optical signal, or to identify an optical path on a network of a plurality of interconnected fibers possibly carrying a plurality of optical signals. The time-varying modulation may be imparted on one or a plurality of optical signals by varying a property of an optical fiber propagating the optical signal. In addition a time-varying modulation may be imparted on one or a plurality of optical signals outside of a fiber or fiber path in which the optical signal is being transmitted (i.e., time-varying modulation imparted at an intermediate point between interconnected fibers).

More specifically, a detectable unique signature is imparted on optical signals propagating through a subject optical fiber or optical fiber path and the imparted signature is subsequently detected to identify the subject optical fiber or path. The inventors herein illustratively depict three properties of light, namely; polarization (i.e., the direction of the oscillating electric field); frequency; and amplitude (the electric field strength) or power (proportional to its square); that may be used in the implementation of the invention disclosed herein. The manipulation of the aforementioned three properties of light, which are used to impose a detectable "signature" on the transmitted light which is subsequently used to identify an optical fiber, are discussed in greater detail below. Although various embodiments of the present invention are being described herein as manipulating three optical properties for imparting a detectable signature on an optical signal propagating in an optical fiber, it will be appreciated by those skilled in the art informed by the teachings of the present invention that more seemingly sophisticated forms of imparting a time-varying modulation on an optical signal propagating in an optical fiber (e.g., phase modulation) and more seemingly sophisticated forms of detection (e.g., heterodyne detection) may be implemented within the concepts of the present invention to identify a subject optical fiber or fiber path.

Figure 2:
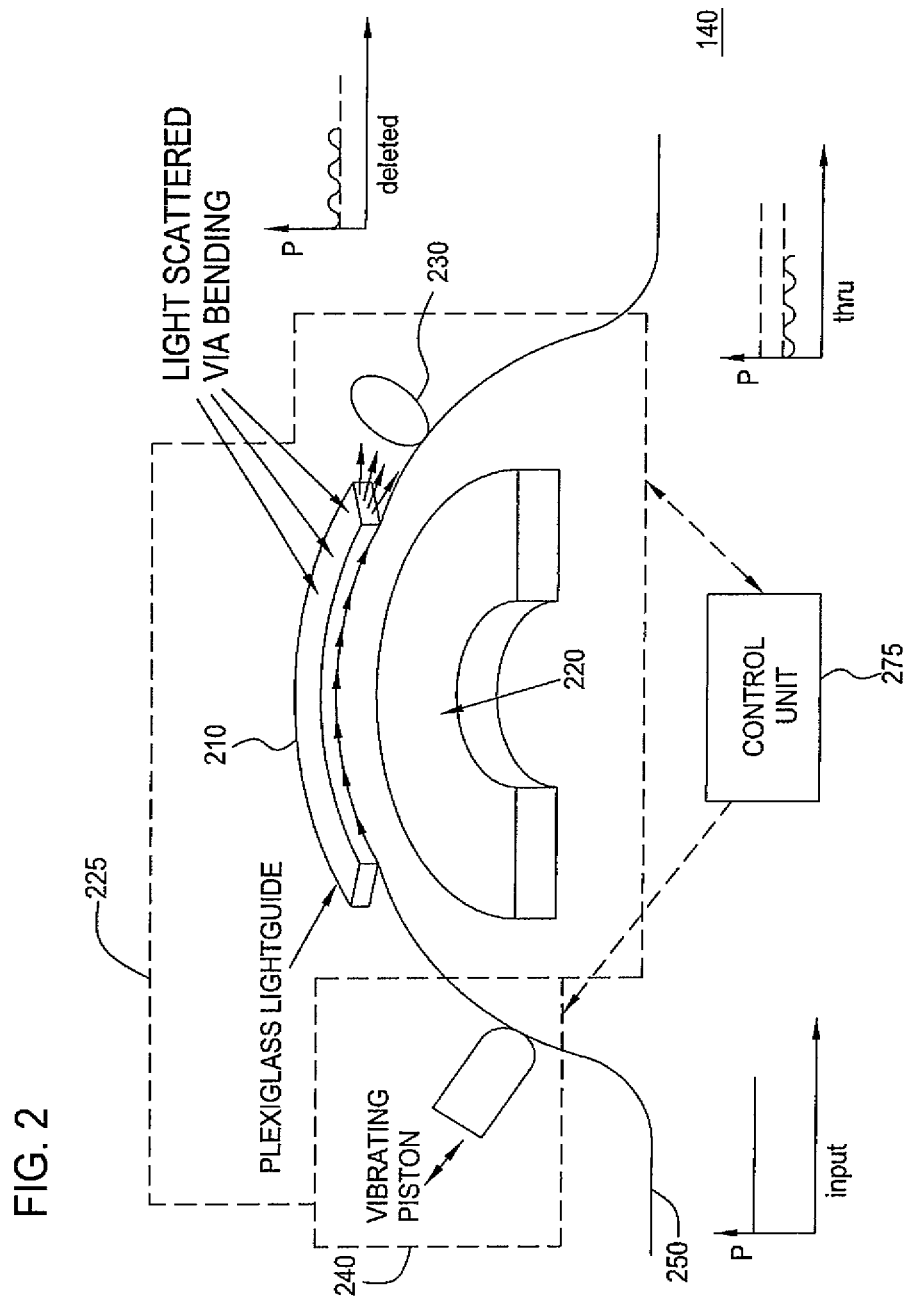
FIG. 2 depicts a high level block diagram of an embodiment of a fiber identification device of the present invention.

FIG. 2 depicts a high level block diagram of an embodiment of a fiber identification device of the present invention suitable for use in the telecommunications office of FIG. 1. The fiber identification device 140 of FIG. 2 illustratively comprises a lightguide (illustratively a plexiglass lightguide) 210, a fiber bending device (illustratively a clamping anvil) 220, a detector (illustratively a photodiode) 230, and a modulating device (illustratively a vibrating piston) 240. FIG. 2 further depicts an optical fiber 250 inter-positioned between the clamping anvil 220 and the plexiglass lightguide 210 to illustrate the concepts of the present invention. For convenience, the embodiment of FIG. 2 depicts an embodiment of the present invention which combines the aspects of modulation and detection processes in a single device.

In the fiber identification device 140 of FIG. 2, the vibrating piston 240, the clamping anvil 220 and the photodiode 230 are depicted as being in close proximity for illustrative purposes and for ease of explanation. It will be appreciated by those skilled in the art informed by the teachings of the present invention that a vibrating piston, a clamping anvil and a photodiode of the present invention may be as close or as far apart as necessary to perform the identification method of the present invention as dictated by economics of production. More specifically, a fiber identification device in accordance with the present invention may be comprised of a transmitter head (i.e., comprised of the vibrating piston 240 of FIG. 2) and a receiver head 225 (i.e., comprised of the lightguide 210, the clamping anvil 220 and the detector 230. The transmitter head 240 may be located on a fiber within, for example, a telecommunications office for imparting a time-varying modulation on an optical signal propagating in the optical fibers of the telecommunications office while the receiver head 225 may be located hundreds of meters or kilometers away for detecting the presence of the imparted time-varying modulation for identification of a subject fiber(s).

In addition, although the vibrating piston 240 of FIG. 2 is depicted as operating on a bent portion of the subject fiber, in alternate embodiments of the present invention wherein a transmitter head and a receiver head are located distances apart from each other, a vibrating piston may impart a time-varying modulation on an optical signal by vibrating a substantially straighter portion of the optical fiber to increase (by adding curvature) or decrease (by reducing curvature) the bending loss applied to an optical fiber. Furthermore, although in FIG. 2, the modulating device is depicted as a vibrating piston, it will be appreciated by those skilled in the art informed by the teachings of the present invention that the modulating device may be any such device capable of providing a mechanical vibration or biasing curvature of the fiber. Even further, the modulating device in other embodiments of the present invention may be substantially any component capable of imparting a time-varying modulation on an optical signal propagating in subject optical fibers as described throughout this disclosure.

Furthermore, although in FIG. 2, the vibrating piston 240, the clamping anvil 220 and the photodiode 230 are depicted as comprising separate components, in alternate embodiments of the present invention, the vibrating piston, the clamping anvil and the photodiode of the present invention may comprise a single component, multiple components or substantially any combination thereof.

Referring back to FIG. 2, in the fiber identification device 140 the vibrating piston 240 is mechanically driven such that it vibrates the fiber 250 and produces a time-varying curvature of the fiber 250, and thus a time-varying loss (i.e., a power variation) in an optical signal guided by the fiber 250 due to "bending loss". Further downstream, a fiber to be tested for identification (illustratively the fiber 250) is bent by the clamping anvil 220. The basic principle is that when the fiber 250 is bent, some of the light (i.e., traffic on the fiber or alternatively, a test signal) is scattered out of the fiber core and subsequently out of the fiber 250, itself. As such and as illustrated by the smaller graphs on the lower left, the lower right, and on the top right of FIG. 2, the power carried by the fiber's fundamental mode is essentially divided into two components. A first component represents the remaining signal in the fiber 250 (graph on lower right) and continues propagating along the fiber 250. The second component represents the portion of the signal that has been scattered out of the fiber 250 (graph on upper right). At least a portion of this scattered signal is collected by the plexiglass lightguide 210 and guided to the detector 230. The detector 230 is configured to have electronics sensitive to the corresponding frequency of the time-varying loss imparted by the vibrating piston 240. As illustrated in FIG. 2, the light leaving the fiber has a small ac component to its amplitude (dithered) due to the overmodulation of the signal propagating in the fiber 250 imparted by the vibrating piston 240 and the detector 230 is well suited to detect power variations at the overmodulation frequencies. Although in FIG. 2 the fiber identification device 140, is illustratively depicted as comprising a lightguide for guiding the scattered light out of the fiber 250, in alternate embodiments of the present invention, a fiber identification device of the present invention does not comprise a lightguide and, as such, the light scattered from a bent fiber is detected directly by an included detector instead.

In accordance with the present invention, the frequency of the dither (i.e., the frequency of the vibration imparted by the vibrating piston 240) is well established and the dither amplitude and static biasing curvature is chosen such that the dither amplitude is small compared to the average power of the signal propagating in the fiber 250 in order to minimally impact the transmitted signal. The detector 230 needs to only sensitively detect the presence of the time variation at the frequency imparted by the vibrating piston 240. The detection of the consistent presence of the time-varying signal at the imparted frequency by the detector 230 is a clear indication that the vibrating piston 240 is acting on that particular fiber upstream and as such, the fiber 250 is identified. That is, if the vibrating piston 240 were not acting upstream on the particular fiber now being tested, the detector 230 would only detect random noise within a detection bandwidth centered about the frequency of the modulation (dithering) imparted by the vibrating piston 240. While there would be some spectral content at the central frequency of the detector 230 in the scattered signal of a fiber that is not being dithered, it would be quite distinguishable from the dithered signal.

In the detection method of the present invention, there is little need for accurate calibration. That is, it is sufficient to detect the presence of the fundamental frequency imparted by the vibrating piston 240 rather than its exact amplitude. Furthermore, the detection of the present invention is an AC measurement, which may be performed with much higher gain, discrimination, and lack of bias drift when compared to an equivalent DC measurement. Even further, in various embodiments of the present invention the most pertinent information carried by the scattered, dithered signal is the dithering frequency and its presence. As such, the filter bandwidth of a detector, such as the detector 230 of FIG. 2, may be restricted to a very narrow range (i.e., the detection time constant may be on the order of seconds) since it is only necessary to confirm the presence of the dithering frequency. Thus, the detection of the present invention may be quite sensitive. In short, the identification process is essentially complementary, in a measurement sense, to an accurate power measurement.

A fiber identification device in accordance with the present invention may further comprise a control unit. For example, the fiber identification device 140 of FIG. 2 further comprises a control unit 275 to enhance the operation when the transmitter head 240 is remotely located from the receiver head 225. The control unit 275 is adapted to control the transmitter head 240 and/or the receiver head 225. For example, the transmitter head 240 may be placed on a portion of the fiber 250 by a technician. The technician may subsequently place the receiver head 225 downstream on the fiber 250 at a position on the fiber 250 located hundreds of meters or kilometers away. After placing the receiver head 225 on the fiber 250, the technician may then remotely send a signal (e.g., a radio or Ethernet signal) to the control unit 275 to cause the control unit 275 to generate a control signal to begin the time-varying modulation of the optical signal in the optical fiber 250 by starting the operation of the vibrating piston 240. The control unit 275 may also be configured to be capable of adjusting the amplitude (or frequency) of the vibration of the vibrating piston 240 (or biasing curvature) to optimize the fiber identification device 140 of the present invention by choosing an amplitude (or frequency) of vibration that will minimally intrude with a propagating optical signal in the fiber 250. Although in the description directly preceding it is described that a remote signal is sent to the control unit to generate a control signal to initiate and control the operation and function of the transmitter head 240, a control unit in accordance with the present invention may either be hard wired to one or both, the transmitter head(s) and the receiver head(s), for communication or may alternatively be in communication with one or both, the transmitter head(s) and the receiver head(s), via remote means.

Furthermore, in an alternate embodiment of the present invention, a fiber identification device may comprise more than one transmitter head. As such, a technician may place a transmitter head on each of a plurality of fibers in, for example, a telecommunications office and then head out to the field. The technician may then test the fibers at a position downstream located on the fiber hundreds of meters or kilometers away by placing a receiver head on the fibers one at a time. The technician may send a remote signal (e.g., a radio signal) to an included control unit adapted to turn one of the transmitter heads on at a time while placing the receiver head on the fibers one at a time to detect the presence of the time-varying modulation imparted on a respective optical signal to identify the optical fiber associated with the transmitter head that is on. In this manner, a plurality of fibers may be identified remotely by a technician. Alternatively, more than one of the plurality of transmitter heads may be turned on at once, each of the transmitter heads having a different frequency of vibration associated with it, and as such, the receiver head may be used to identify the presence of the various known frequencies to identify an optical fiber associated with the transmitter head vibrating at a specific known frequency. Although in the description above various embodiments of the fiber identification device of the present invention are depicted and described as having a remotely controlled transmitter head(s), a receiver head(s) may also be remotely controlled by sending a remote signal (e.g., a radio signal) to an included controller for operatively controlling the receiver head(s) (e.g., the detector(s) and any adjustable bending devices) of the present invention.

Figure 3:
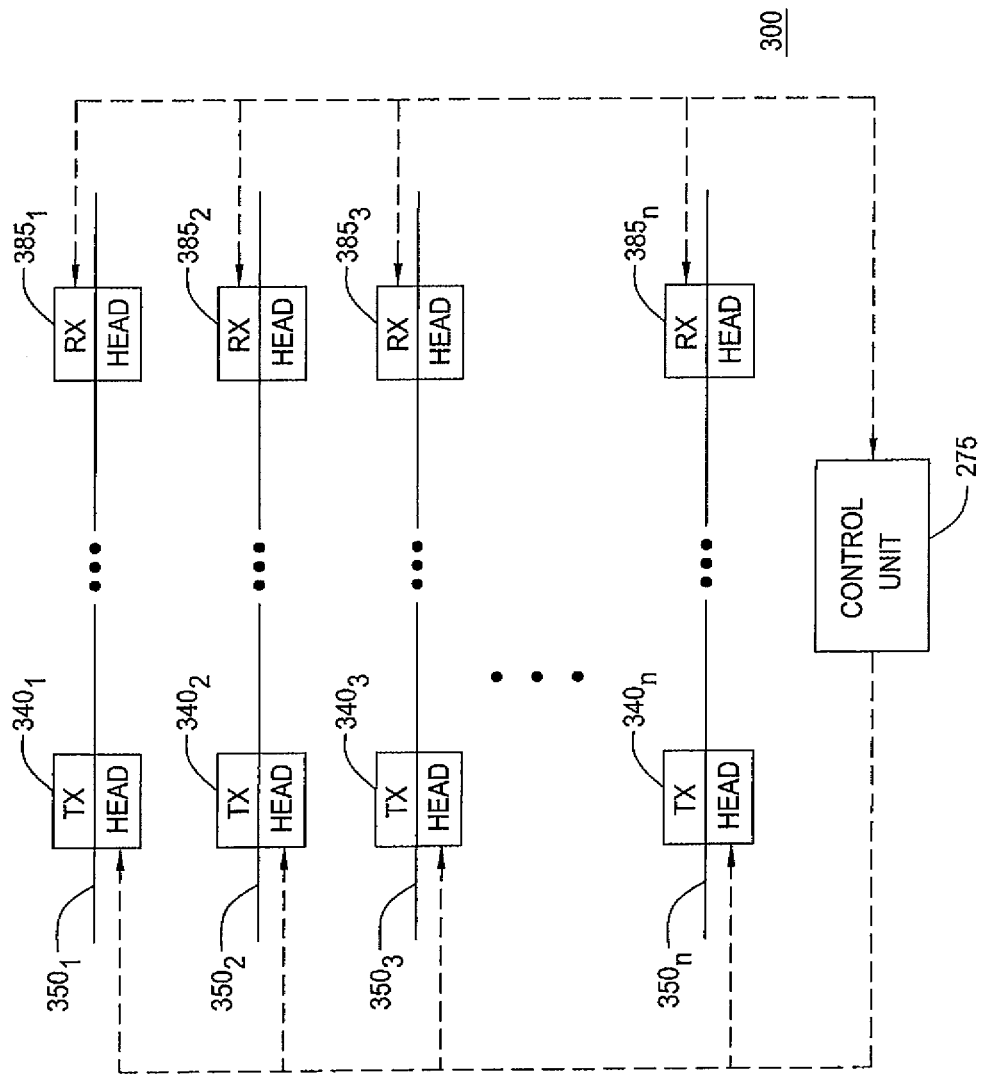
FIG. 3 depicts a high level block diagram of an embodiment of a fiber identification system in accordance with the present invention.

Even further, in yet another embodiment of the present invention, a group of fiber identification devices in accordance with the present invention may comprise a fiber identification system. That is, a fiber identification system of the present invention may comprise more than one transmitter head and more than one receiver head. For example, FIG. 3 depicts a high level block diagram of an embodiment of a fiber identification system 300 in accordance with the present invention. The fiber identification system 300 of FIG. 3 comprises a plurality of transmitter heads 340$_1$-340$_N$ (collectively transmitter heads 340), a plurality of receiver heads 325$_1$-325$_N$ (collectively receiver heads 325), a plurality of optical fibers 350$_1$-350$_N$ (collectively optical fibers 350) and a controller 275. As in the fiber identification device 140 of FIG. 2, each of the transmitter heads 340 of the fiber identification system 300 includes at least one modulating device, such as a vibrating piston (not shown). Similarly, as in the fiber identification device 140 of FIG. 2, each of the receiver heads 325 of the fiber identification system 300 of FIG. 3 includes at least a fiber bending device (e.g., an anvil (not shown)) and a detector (not shown). Alternatively, the receiver heads 325 of the fiber identification system 300 of FIG. 3 may each further include a lightguide.

The plurality of transmitter heads 340 and the plurality of receiver heads 325 in the fiber identification system 300 of FIG. 3 may be placed on respective fibers by a technician in an attempt to identify specific optical fibers. More specifically, a technician may connect a transmitter head 340 on a position on each of the plurality of optical fibers 350 that may be located in, for example, a telecommunications office. The technician may then head out to the field. The technician may then connect a receiver head 325 downstream on each of the plurality of fibers 350 thought to be the same fibers or in the same fiber paths as the fibers in the office at a position located hundreds of meters or kilometers away. In such embodiments, the fiber identification method of the present invention may be executed manually or automatically. For example, a technician may send a remote signal (e.g., a radio signal) to the control unit 275 which is adapted to control the transmitter heads 340 for turning the vibration of the transmitter heads 340 on and off. The technician may then choose to monitor different ones of the plurality of receiver heads 325 to identify the presence of the time-varying modulation imparted by the specific ones of the transmitter heads 340 to identify specific fibers.

Alternatively and for automatic operation, the control unit 275 of the present invention may be adapted to automatically control the operation of the plurality of transmitter heads 340 and the plurality of receiver heads 325 in substantially any combination and frequency to identify the subject optical fibers by iteratively controlling respective ones of the transmitter heads 340 and the receiver heads 325 to identify the presence of an imparted respective time-varying modulation imparted on respective propagating optical signals and as such, identify each of the plurality of optical fibers. The control unit 275 of the present invention keeps track of which transmitter heads 340 are operating and at what frequencies. Each of the plurality of receiver heads 325 transmits the respective outputs of the detectors (not shown) of the receiver heads 325 to the control unit 275. The control unit 275, knowing which detected signal was received from which receiver head 325, is able to identify the plurality of optical fibers 350 by examining the received outputs of the receiver heads 325 and identifying the respective time-varying modulation imparted on the respective optical signals propagating in the respective optical fibers 350.

Alternatively, the fiber identification system 300 of FIG. 3 may be configured to comprise a single detector for receiving the scattered portions of the respective optical signals from the respective optical fibers. In such an embodiment, the single detector is configured such that it is operative to receive respective scattered portions of the optical signals of the respective optical fibers one at a time and to send the respective detected information to the control unit. The control unit may then identify the respective optical fibers from the information received from the single detector.

Even further, in various embodiments of the present invention, a control unit of the present invention may be adapted to generate a control signal to cause a signal source (i.e., a signal transmitter) to apply a distinctive additional signal or over-modulation (i.e., time-varying modulation) of an optical signal to be transmitted in an optical fiber or fibers to be identified. That is, a control unit of the present invention may be adapted to control a modulator of one or more transmitters of a system to cause a time-varying modulation to be imparted by the transmitters on respective optical signals to be transmitted on respective optical fibers for subsequent identification of the optical fibers in accordance with the present invention.

Figure 4:
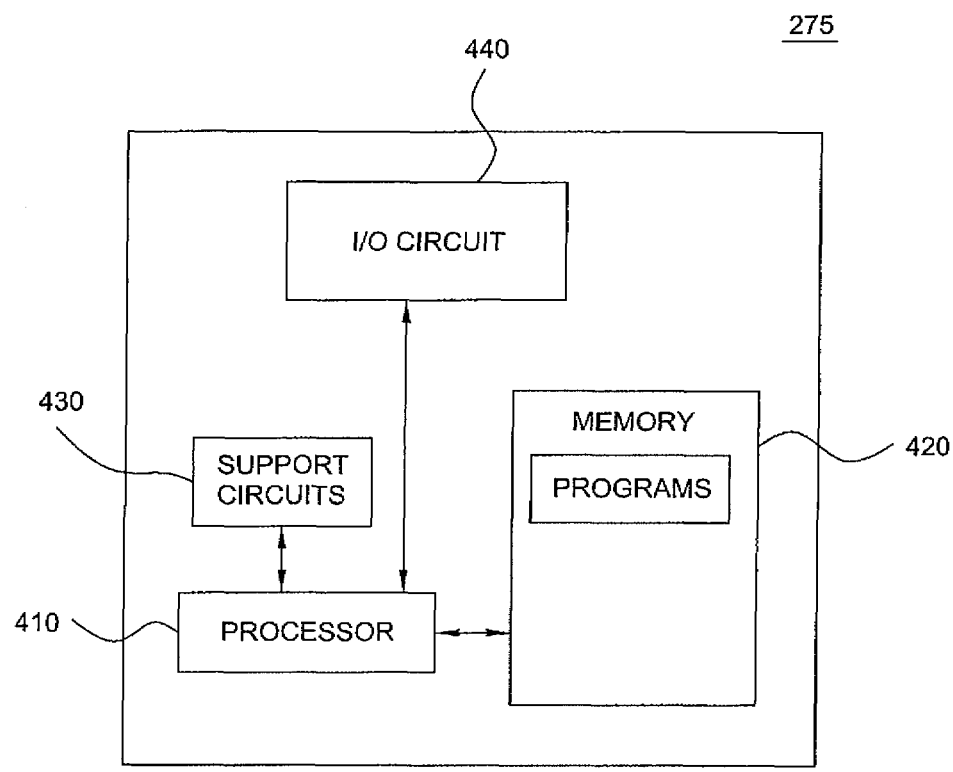
FIG. 4 depicts a high-level block diagram of an embodiment of a control unit suitable for use in the fiber identification device of FIG. 2 and the fiber identification system of FIG. 3.

FIG. 4 depicts a high-level block diagram of an embodiment of a control unit suitable for use in the fiber identification device 140 of FIG. 2 and the fiber identification system 300 of FIG. 3. The control unit 275 of FIG. 4 comprises a processor 410 as well as a memory 420 for storing information and control programs. The processor 410 cooperates with conventional support circuitry 430 such as power supplies, clock circuits, cache memory and the like as well as circuits that assist in executing the software routines stored in the memory 420. As such, it is contemplated that some of the process steps discussed herein as software processes may be implemented within hardware, for example, as circuitry that cooperates with the processor 410 to perform various steps. The control unit 275 also contains input-output circuitry 440 (i.e., may be remote input-output circuitry) that forms an interface between the various functional elements communicating with the control unit 275. For example, in the embodiment of FIG. 2, the control unit 275 communicates with the transmitter head 240 via a signal path S1 and to the receiver head 225 via signal path $O_1$.

Although the control unit 275 of FIG. 4 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

Although in the embodiments of fiber identification devices and a fiber identification system in accordance with the present invention depicted above (e.g., FIG. 2 and FIG. 3) the modulating device is depicted as comprising a vibrating piston 240, 340, various other means for imparted a time-varying modulation (e.g., time-varying loss) on an optical signal propagating along on optical fiber, such as piezo-electric transducers, motors and vibrators, may be implemented in a fiber identification device and a fiber identification system in accordance with the present invention. More specifically, the bend loss imparted in a fiber may be characterized according to equation one (1), which follows:

$$\alpha = c_2 \exp(-c_1 R), \tag{1}$$

where $\alpha$ is the imparted loss per unit length (and can be considered as proportional to the light scattered into the detector), R is the fiber's radius of curvature, and $c_2$ and $c_1$ are constants which are not strong functions of R, but are functions of the fiber design and the wavelength of light propagating in the fiber. The exponential dependence on R should be noted. More specifically it should be noted that as R decreases, the scattered light goes from very small values to very large values quite rapidly. As a consequence of this exponential dependence, a given curvature (static or biasing) at the location of the vibrating piston may be imparted, such that small additional changes applied make more significant variations in the loss without the necessity of making large variations in the bend radius of the fiber. Because of the dependence of $c_1$ and $c_2$ on fiber types and wavelengths, the implication is that fiber identification devices of the present invention may implement a variable fiber bending device (e.g. a variable anvil, or more than one anvil) to apply the bends at both the location of the vibrating piston and the location of the anvil and detector.

Therefore, to exploit the advantages of the present invention while minimizing the system impact (recalling that the loss may vary strongly with wavelength), various embodiments of the present invention comprise a means for providing an adjustable bending radius to optical fibers and thus, adjustable bending losses for varied applications. For instance, an embodiment of a fiber identification device of the present invention may comprise various fiber bending devices (e.g., anvils), each possessing a different radius of curvature. As such, when an accurate DC measurement must be made on a fiber wherein loss is not too great an issue, a smaller radius anvil would be implemented. The smaller radius anvil would impose more loss on the fiber, but would insure accuracy by diverting more power to the detector. Such a method is preferable for applications in tracing, characterizing, and inventorying dark fibers, for example, where loss is not an issue.

On the other hand, for applications in which loss is an issue, such as fibers carrying high speed traffic that operate near the margin of their power budgets, it is imperative to minimize loss. In such applications, the modulation frequency, for example from the vibrating piston, is well-known and thus can be easily detected, while its magnitude may not necessarily need to be accurately ascertained. Thus, to insure minimal loss, the radius of curvature of the fiber bending device would be larger in order to apply less loss to a propagating optical signal in the fiber, and thus minimizing the time-variant component of loss. This aspect of the present invention may be implemented by providing a set of interchangeable fiber bending devices or by implementing adjustable fiber bending devices that increase or decrease the radius of curvature of the fiber in the active region via an adjustment. Various other means for providing adjustable bending radii for optical fibers, such as sliding clamps, levers, detents, etc., are known and such other means may be implemented in a fiber identification device in accordance with the present invention.

In addition, because the amount of bend loss experienced by an optical signal depends on the wavelength of an optical signal or the wavelengths of an optical signal (i.e., WDM signals are comprised of various wavelengths), with the longer wavelengths being more lossy than the shorter wavelengths, a bend radius for scattering light out of an optical fiber in accordance with the present invention must be carefully chosen. More specifically, a bend radius that causes a negligible loss on a short wavelength might cause a severe loss on a much longer wavelength. For instance, in current coarse WDM (CWDM) systems, it is common for there to be a 140 nm separation between the top and the bottom wavelengths, and as such, there can be significant differences in the bend losses that may result in catastrophic losses on the longer wavelengths.

In the present invention, any vibration that is applied to a fiber would preferably be applied in such a way that it does not damage the fiber. For example it may be advantageous to configure a subject fiber to have a freestanding section to which a vibration in accordance with the present invention is applied. As such, the fiber would be less susceptible to damage from the modulation. Furthermore and with regard to the acoustic frequency of operation, the conventional frequency choices (e.g., 270, 1000, 2000 Hz) to commercial live fiber indicators are resistant to light leaks from office lights, etc., at 60 Hz and 120 Hz. However, since the energy of a vibrating fiber is proportional to the square of its velocity, the power consumption of the bending device, such as the piston, will scale substantially with the square of the frequency. Accordingly, it may be advantageous to set the frequency to be even lower than 270 Hz while recognizing the prevalence of the 60 Hz noise sources.

In typical prior art fiber identification devices, AC tones used to identify fibers are essentially modulated at 100% depth (i.e., an on-off modulation at acoustic frequencies) and are implemented on "dark fibers" carrying no traffic on live fiber. Such deep modulation, however, surely impairs the signal transmission. That is, the light lost in impressing the signature tone will manifest itself as an additional time-varying loss, closing the "eye pattern" (as familiar to those skilled in the art) by that same amount and would completely close the eye pattern for deep modulation. Thus, it would be preferable to have only a small modulation depth (i.e., loss corresponding to less than a dB loss, for example) on the signal light. As such, in various embodiments of the present invention, the light corresponding to the logical "1 s" which leave a subject fiber after experiencing the imparted vibrating bend loss, do not vary between 0 and 1 as they do for 100% modulation, but preferably vary between levels which are close to 1, such as between 0.85 and 0.95 of the original amplitude. In such an example, the fiber identification device of the present invention would perceive a 5% insertion loss and a 10% time-dependent loss, which, as far as system performance is concerned, is considered a 15% loss, or approximately 0.7 dB.

Figure 5:
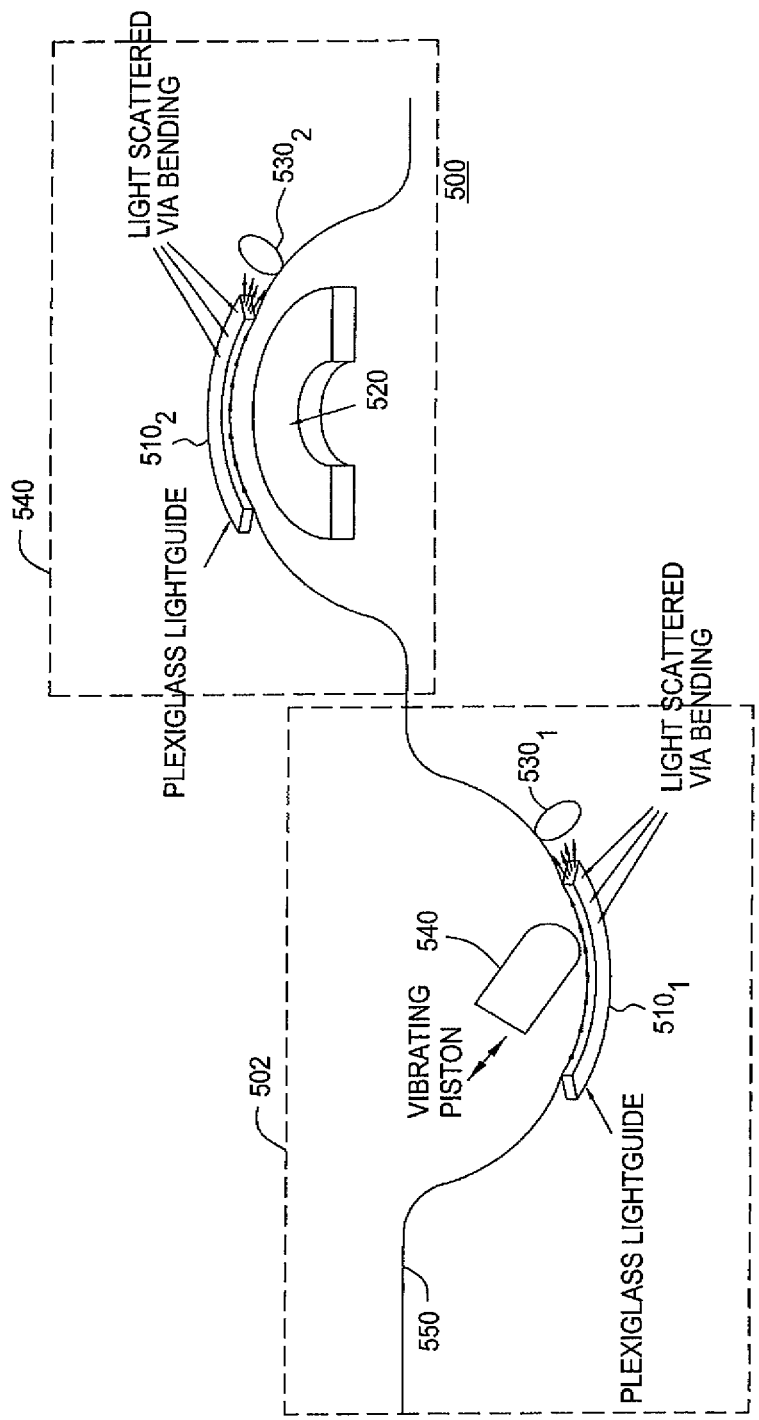
FIG. 5 depicts a high level block diagram of an alternate embodiment of a fiber identification device of the present invention.

FIG. 5 depicts a high level block diagram of an alternate embodiment of a fiber identification device of the present invention. The fiber identification device 500 of FIG. 5 comprises substantially the same components as the fiber identification device 140 of FIG. 2 with the addition of a second lightguide and a second detector. The fiber identification device 500 of FIG. 5 illustratively comprises a first and a second lightguide (illustratively plexiglass lightguides) $510_1$ and $510_2$, a clamping anvil 520, a first and a second detector $530_1$ and $530_2$ (collectively detectors 530), and a modulating device (illustratively a vibrating piston) 540. In the fiber identification device 500 of FIG. 5, the first lightguide $510_1$, the vibrating piston 540 and the first detector $530_1$ comprise a transmitter head 502, and the second lightguide $510_2$, the clamping anvil 520 and the second detector $530_2$ comprise a receiver head 504. FIG. 5 further illustrates an optical fiber 550.

Similar to the fiber identification device 140 of FIG. 2, in the fiber identification device 500 of FIG. 5, the vibrating piston 540 is mechanically driven such that it vibrates the fiber 550 and produces a time-varying curvature of the fiber 550, and thus a time-varying loss (power variation) in the fiber 550 due to "bending loss". The loss imparted by the vibrating piston 540 causes some light to scatter out of the fiber. In the fiber identification device 500 of FIG. 5, the first plexiglass lightguide $510_1$ collects at least a portion of the light scattered due to the vibration of the optical fiber 550 and guides the scattered light to the first detector $530_1$. The first detector $530_1$ detects the scattered light from the first plexiglass lightguide $510_1$. The light from the first plexiglass lightguide $510_1$ and detected by the first detector $530_1$ may be used to verify the presence and direction of light in the optical fiber 550, that the vibrating piston 540 is operating correctly (i.e., that the light in the optical fiber does in fact have an imparted time-varying modulation), and/or to provide a reference signal to compare to the time-varying modulation subsequently detected by the second detector $530_2$. Alternatively, the scattered light detected by the first detector $530_1$ may be used to identify how much power is being scattered out of the fiber due to the vibration which may be used to adjust the amplitude and the frequency of the vibration of the vibrating piston 540 to optimize the fiber identification device of the present invention such that a propagating optical signal is minimally affected.

Further downstream, the fiber to be tested for identification (presumptively the fiber 550 or a fiber connected to it) is bent by the clamping anvil 520. As previously described, when the fiber is bent, some of the light is scattered out of the fiber. At least a portion of this scattered signal is collected by the plexiglass lightguide 510₂ and is guided to the second detector 530₂. As illustrated in FIG. 5 and as previously described, the light leaving the fiber 550 has a small AC component to its amplitude (dithered) due to the overmodulation of the signal propagating in the fiber 550 imparted by the vibrating piston 540.

As before, the second detector 530₂ needs to detect only the presence of the time variation at the specific frequency imparted by the vibrating piston 540. The detection of the presence of the time-varying signal at the imparted frequency by the second detector 530₂ enables the identification of the fiber. As previously stated, the additional detector 530₁ enables the detection and measurement of the time-varying modulation (i.e., signature) imparted on a propagating optical signal, the signature to be later detected for identifying a subject optical fiber.

In alternate embodiments of the present invention, the transmitter head 502 of the fiber identification device 500 of FIG. 5 further comprises a clamping anvil to apply a biasing curvature and the receiver head 504 further comprises a modulating device (e.g., a vibrating piston) such that the fiber identification device of the present invention is capable of being used in either direction to identify an optical fiber. That is, in a fiber identification device in accordance with this embodiment, an optical fiber located in the region of a receiver head may be modulated such that a time-varying modulation is imparted on an optical signal propagating therein. The modulated optical fiber may then be identified upstream by a transmitter head of the fiber identification device in accordance with this embodiment. Alternatively, an optical fiber located in the region of the transmitter head may be modulated such that a time-varying modulation is imparted on an optical signal propagating therein. The modulated optical fiber may then be identified downstream by the receiver head of the fiber identification device in accordance with this embodiment In alternate embodiments of the present invention, the polarization of light propagating in an optical fiber may be manipulated to produce a time-varying modulation that may later be detected to identify the optical fiber. For example, the polarization of light may be modified by disturbing the normal propagation of light in some way, introducing birefringence in the fiber (i.e., changes to the index of refraction which are non-uniform) by altering the fiber in some way, or by applying a field that couples to a property in the fiber. For illustrative purposes the Faraday effect, caused by magnetic fields, is considered. For example, when an axial magnetic field is applied to a fiber carrying an optical signal, it makes light with right circular polarization travel at a different velocity than light with left circular polarization. More specifically, a circular birefringence is imparted. For linearly polarized light, applying an axial magnetic field to a fiber carrying an optical signal thereby makes the direction of polarization change. Various means for applying a magnetic field, such as a solenoid, to a fiber carrying an optical signal to produce a time-varying modulation in the optical signal may be implemented within the concepts of the present invention. The inventors further consider and propose that the application of an electric field will have a similar effect as the application of a varying magnetic field as described above. As such, various means for applying an electric field to a fiber carrying an optical signal to produce a time-varying modulation in the optical signal, such as by adapting an optical fiber(s) to comprise electrodes, may be implemented within the concepts of the present invention.

For example, and referring to FIGS. 1, 2, 3 and 5 above, a time-varying magnetic field may be applied to a fiber 250, 350, 550 in place of the modulation provided by the vibrating piston 240, 340, 540. A detector 230, 330, 530 would therefore be adapted to detect the changes in the polarization of a propagating optical signal scattered out of the fiber 250, 350, 550. For example in one embodiment of the present invention, a detector 230, 330, 530 is equipped with a polarizer(s) to enable the detector to detect the polarization of the modulated propagating optical signal. In addition, the detection would be configured to occur at the frequency of the time-varying magnetic field. Even further, in alternate embodiments of the present invention, similar methods and apparatuses are implemented for identifying an optical fiber using other types of time-varying birefringence, such as squeezing, etc. These embodiments of the present invention have the advantage that the time-varying "signature" may be introduced with very little loss such that the power and frequency of a propagating optical signal in the fiber remains substantially the same and only the direction of polarization changes.

It should be noted however, that with this approach if a propagating optical signal, while entering the region of the fiber having the time-varying birefringence of the present invention, has the same state of polarization as the birefringence (i.e. it is in an eigenstate of the birefringence), the optical signal merely experiences a change in velocity but does not undergo a change in its state of polarization. Thus, a fiber identification device configured to detect a change in polarization would fail to detect any change. As such, it is important to ensure that the birefringence applied does not have the same state of polarization as a propagating optical signal (i.e., the fiber may be bent or twisted, or fixed forms may be used to create a polarization controller).

Although various specific methods of imparting a time-varying modulation on a propagating optical signal are presented herein within specific embodiments of the present invention, it will be appreciated by those skilled in the art informed by the teachings of the present invention that substantially any method for imparted a time-varying modulation on a propagating optical signal in a fiber may be used to subsequently identify the fiber in accordance with the present invention. For example, there are a number of non-linear interactions that may shift the frequency of light, and such interactions may be used to impose a known frequency shift on a propagating optical signal in a fiber. More specifically, several optical sensor and signal processing techniques implement the interaction of acoustic waves and light to impart a frequency shift. That is, the light interacts with the acoustic phonons to create light at upshifted or downshifted frequencies. Such shifts in frequency may be subsequently detected to identify an optical fiber in accordance with the present invention. Such frequency shifts may be imparted by various means, such as acoustic horns or acoustic transducers. In addition, other means, such as a lithium-niobate phase modulator, may be implemented to produce such non-linear interactions.

Figure 6:
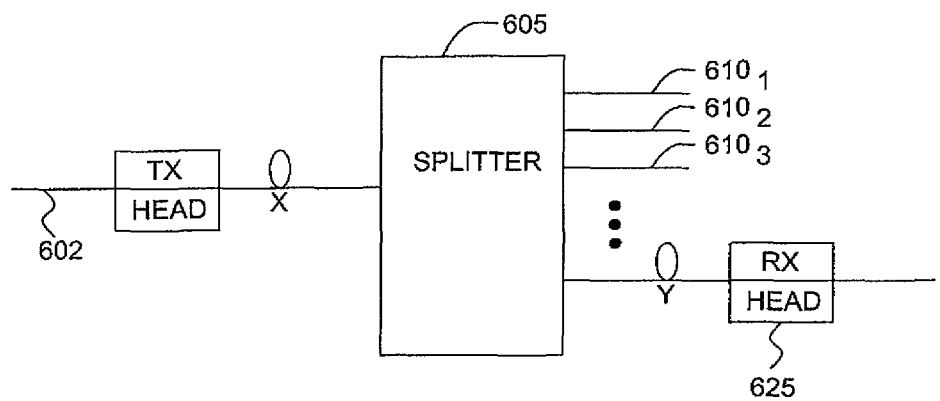
FIG. 6 depicts a high level block diagram of a passive optical network (PON) including an embodiment of a fiber identification device of the present invention.

The present invention may also be used to establish logical continuity through devices by separating the transmit head and the receive head. For example, FIG. 6 depicts a high level block diagram of a passive optical network (PON). The PON 600 of FIG. 6 comprises an input branch 602, a trunk 605 and a plurality of output branches 610₁-610N (collectively output branches 610). The PON 600 of FIG. 6 further comprises a fiber identification device comprising a transmitter head 640 and receiver head 625 in accordance with the present invention. In the PON 600 of FIG. 6, light from the trunk 605 is divided into the output branches 610 and transmitted to subscribing customers (not shown). Signals (i.e., in the form of light) from the customers is combined in the trunk 605 and transmitted back to a head end (not shown). Continuity of communication between the head end and the customers may be verified in either direction implementing the concepts of the present invention in much the same manner as described above. For example, regarding point X which is on the input branch 602, and point Y which is on one of the branches, the transmit head 640 may be located near point X and the receive head 625 on point Y to establish that light was traveling from X to Y or vice versa. This might be useful, for instance, in a situation in which the fiber Y were one of a multiplicity of fibers in a closet, all carrying traffic, that might be otherwise indistinguishable. As such, communication may be verified without the need to interrupt the operation of the PON 600.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. An apparatus for detecting a presence of a time-varying modulation in an optical fiber, the apparatus comprising:
   a first modulating device that facilitates imparting a time-varying signal onto an existing optical signal to generate a propagating optical signal in the optical fiber;
   a first adjustable fiber bending device that facilitates bending the optical fiber such that a portion of the propagating optical signal is scattered out of the optical fiber;
   a first detector for receiving the portion of the propagating optical signal that is scattered for detecting the presence of the time-varying modulation; and
   a lightguide that facilitates guiding the portion of the propagating optical signal that is scattered out of the optical fiber to the first detector.

2. The apparatus of claim 1, wherein the imparting and detecting do not interrupt a propagation of the propagating optical signal along the optical fiber.

3. The apparatus of claim 1, wherein the optical fiber comprises a plurality of interconnected optical fibers.

4. The apparatus of claim 1, further comprising a control unit, wherein the control unit comprises a memory for storing information and program instructions and a processor for executing the program instructions to configure the apparatus to control:
   the imparting of the time-varying signal onto the existing optical signal propagating in the optical fiber; and
   the detecting of the presence of the time-varying modulation to identify the optical fiber.

5. The apparatus of claim 4, wherein the control unit is further configured to cause a source of the existing optical signal to impart the time-varying signal onto the existing optical signal.

6. The apparatus of claim 1, wherein the first modulating device comprises a transmitter head, and the first adjustable fiber bending device and the first detector comprise a receiver head.

7. The apparatus of claim 6, wherein the transmitter head further comprises a second adjustable fiber bending device and a second detector, and the receiver head further comprises a second modulating device.

8. The apparatus of claim 1, wherein the first modulating device comprises a vibrating piston and the vibrating piston varies a curvature of a portion of the optical fiber as a function of time such that a time-varying loss of power is generated in the propagating optical signal.

9. The apparatus of claim 1, wherein the first modulating device comprises a piezo-electric transducer and the piezo-electric transducer varies a curvature of a portion of the optical fiber as a function of time such that a time-varying loss of power is generated in the propagating optical signal.

10. The apparatus of claim 1, wherein the first adjustable fiber bending device is adjustable for varying a radius of a bend on the optical fiber.

11. The apparatus of claim 1, wherein the first adjustable fiber bending device comprises an anvil.

12. The apparatus of claim 1, wherein the lightguide comprises a plexiglass lightguide.

13. The apparatus of claim 1, wherein the first modulating device introduces a varying magnetic field and varies a polarization of the existing optical signal as a function of time by varying a birefringence of the optical fiber as a function of time.

14. The apparatus of claim 13, wherein the first modulating device comprises a solenoid.

15. The apparatus of claim 13, wherein the first detector further comprises a polarizer.

16. The apparatus of claim 1, wherein the first modulating device varies a frequency of the existing optical signal as a function of time through non-linear interactions.

17. The apparatus of claim 16, wherein the first modulating device comprises an acoustic horn.

18. The apparatus of claim 1, further comprising at least a second detector for detecting the time-varying modulation near a point of the imparting of the time-varying signal such that a subsequent downstream detection of the time-varying modulation is compared to the time-varying modulation detected near the point of the imparting of the time-varying signal for identification of the optical fiber.

19. The apparatus of claim 1, wherein the apparatus is implemented to verify communications between at least two points in a passive optical network.

20. The apparatus of claim 1, wherein the apparatus is implemented to verify communications between a plurality of points in a passive optical network.

* * * * *